INVENTORS
WALTER TURTON
WALTER T. REILLY

March 31, 1964 W. TURTON ETAL 3,127,306
STRETCH TYPE FABRICS HAVING TEMPORARY STABILITY
Filed Oct. 27, 1958 3 Sheets-Sheet 2

INVENTORS
WALTER TURTON
WALTER T. REILLY
BY
ATTORNEYS

March 31, 1964 W. TURTON ETAL 3,127,306
STRETCH TYPE FABRICS HAVING TEMPORARY STABILITY
Filed Oct. 27, 1958 3 Sheets-Sheet 3

INVENTORS
WALTER TURTON
WALTER T. REILLY
BY
Kenyon & Kenyon
ATTORNEYS

United States Patent Office 3,127,306
Patented Mar. 31, 1964

3,127,306
STRETCH TYPE FABRICS HAVING TEMPORARY STABILITY
Walter Turton, Stamford, Conn., and Walter T. Reilly, Akron, Ohio, assignors, by direct and mesne assignments, to J. P. Stevens & Co., Inc., New York, N.Y., a corporation of Delaware
Filed Oct. 27, 1958, Ser. No. 769,937
4 Claims. (Cl. 161—89)

The present invention relates to stretchable fabrics having temporary dimensional stability and to methods for manufacturing such fabrics, and more particularly to a fabric of this type adapted to act as a reinforcement for a moldable plastic layer bonded thereto.

Increasing use is being made of synthetic plastics, such as vinyl compositions, as a covering material in place of leather or textiles. In order to enhance the tear strength and durability of the covering, it is necessary to bond the plastic facing to a fabric web to form a strong laminated sheeting. Since the laminated plastic covering is ordinarily applied to shaped surfaces, such as seats and the backs of chairs, the covering must be moldable to the contour of the shaped surface. For the covering to be capable of going around curves and corners and yet present a smooth surface it becomes essential that is possess a high stretch characteristic. This requirement creates serious problems in a plied plastic textile covering.

With reference solely to the plastic layer in the laminated sheeting, there is no difficulty in connection with stretch characteristics. The plastic layer may be conformed to any contoured surface. Nor is it difficult to impart stretch characteristics to the fabric base when the fabric is considered apart from the plastic layer. However, when bonding the plastic layer to the fabric base, it is important during this process that the dimensions of the base be maintained even though it is expected to stretch in the ultimate combination. In other words, the stretch fabric must possess temporary dimensional stability.

Attempts have heretofore been made to impart dimensional stability to expandable fabric, but is has been found that the expedients used to control the fabric dimensions remove an appreciable percentage of stretch from the fabric or in other ways impair the fabric characteristics. Thus, in the patent to Hubbard et al. No. 2,737,701, a woven textile fabric is contracted by heat-shrunken filaments embodied in the warp and weft and while so contracted it is provided with an elastic backing such as a rubber film that is adapted to yieldingly hold the fabric in its contracted condition. In order that the laminated fabric may stretch, it is necessary to destroy the heat-shrunken filaments which lock the fabric in its contracted state. This is accomplished by heat treatment which melts only the shrunken filaments. It has been found however that such treatment may cause the melted resin of the shrunken filaments to form hard, objectionable particles at the face of the fabric and that the heat may also injure the fabric yarns.

In view of the foregoing, it is the principal object of this invention to provide a fabric which has temporary dimensional stability, particularly in the length of the fabric, whereby the fabric may be controlled during the plastic coating or bonding process, but which control will not seriously impair stretch qualities when the plastic and fabric are bonded together.

More specifically it is an object of the invention to provide a stretchable base fabric for a reinforced fabric combination in which temporary stability is effected by means of additional threads added during the fabric manufacturing process. The added threads are designed to rupture at an elongation below that required to rupture the yarns forming the base fabric. The percentage of stretch required in the fabric may vary and may be up to or more than 100%. The type of yarn used to form the base fabric may be of any type of natural or synthetic fiber but will vary according to the degree of stretch required in the ultimate product. Where a high stretch factor is called for, specially processed yarns may be used, such as are presently available in the stretch nylon field.

A further object of the invention is to provide a fabric having the appearance and hand of fabrics produced by spun yarns, the fabric including filamentary "break" yarns which, when ruptured, produce the desired effect. Another advantage of the invention is that the ruptured yarns create pattern effects and make possible a variety of decorative color combinations.

Yet another advantage of the invention is to provide an improved method for forming laminated plastic coated fabric-backed articles.

For a better understanding of the invention as well as other objects and further features thereof, reference is had to the following detailed description to be read in conjunction with the accompanying drawings wherein like components in the various views are identified by like reference numerals.

Figure 1:
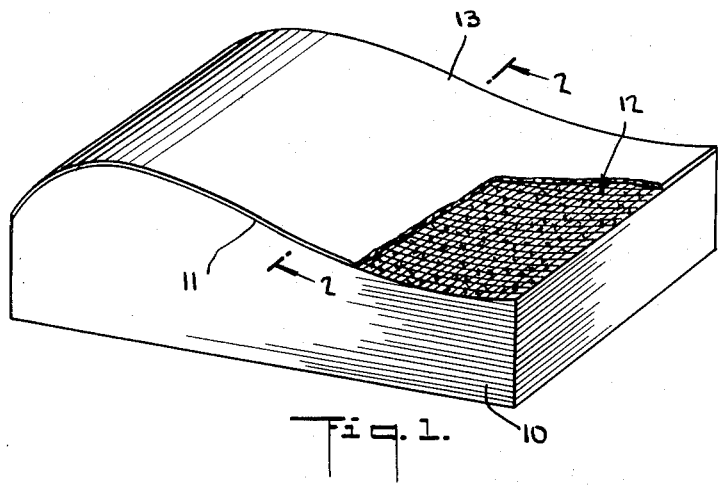
FIG. 1 is a perspective view of a contoured body whose surface is covered by a laminated plastic fabric covering in accordance with the invention.
Figure 2:
FIG. 2 is a sectional view taken along the plane of lines 2—2 in FIG. 1.

Referring now to the drawings and more particularly to FIG. 1, there is shown a body 10 to be covered, the body having a contoured top surface 11. In practice, body 10 may be a seat, a chair back or any other shaped members having a curvature or corners requiring molding of the covering thereon to produce a smooth face. The covering is of plied construction and is constituted by a stretchable base fabric, generally designated by numeral 12, laminated to a plastic top layer 13.

The plastic layer 13 may be of any suitable material having the desired characteristics for the purpose intended and may be applied to the base fabric 12 as a plastic film or it may be applied in sheet form to the base fabric and bonded thereto by a suitable adhesive. Dimensional stability of the fabric must be maintained in order that the inherent stretch is not used up during the bonding process and is conserved in order that maximum stretch is available in the bonded product. On the other hand, once the bonding is completed, it is necessary that the base fabric be stretchable to permit molding of the plied covering.

Figure 3:
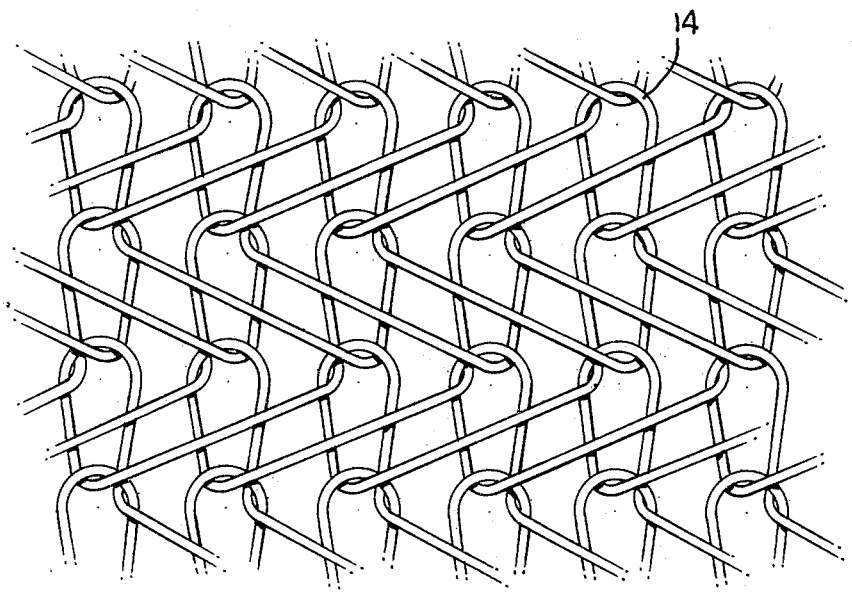
FIG. 3 is an enlarged diagrammatic representation of a conventional stretch formation produced on a two bar machine to form the ground for a fabric in accordance with the invention.
Figure 4:
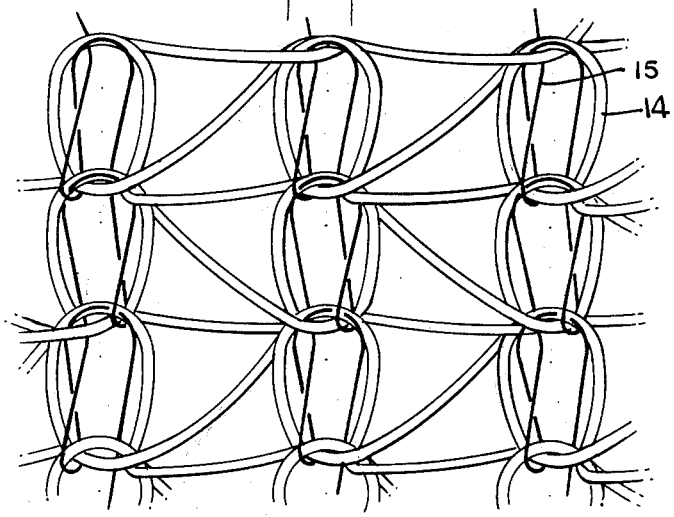
FIG. 4 is a diagrammatic view of the fabric after "break" threads are added thereto.
Figure 5:
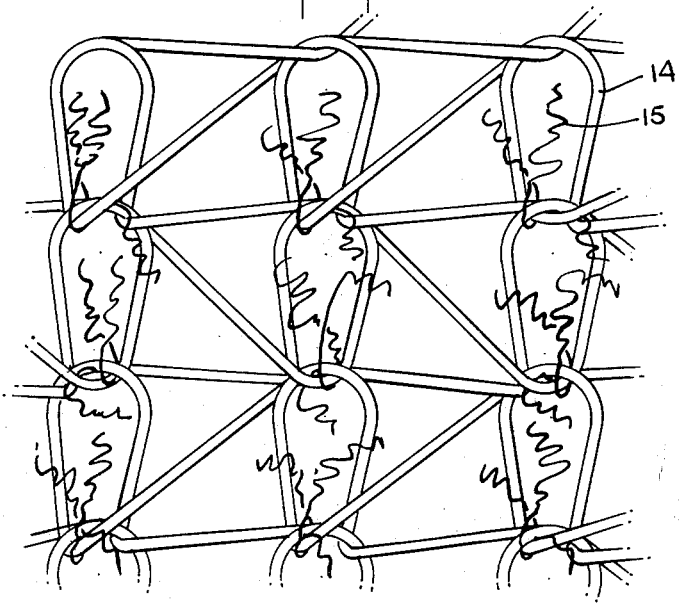
FIG. 5 is a diagrammatic view of the fabric shown in FIG. 4 subsequent to a stretching thereof.

A fabric having the desired characteristics is shown in FIGS. 3 to 5. The fabric is constituted by a knitted ground fabric 14 in which is superimposed "break" threads 15 which introduce temporary dimensional stability to the base fabric. The ground fabric is of the stretchable type, whereas the "break" threads are constructed into the fabric to have less stretch or elongation. At the same time the "break" threads 15 have sufficient strength characteristics, which may be predetermined, to supply dimensional stability to the base fabric during an intermediate processing operation.

The knitted ground fabric is preferably made on a warp knitting or tricot machine, a Raschel machine or similar type with two or more warps and guide bars. The ground fabric may be formed with one guide bar or a plurality of guide bars and the "break" threads incorporated into the ground fabric by means of an additional guide bar.

One example of a suitable ground fabric is shown in FIG. 3 which shows a plain single bar construction with a two needle movement, the yarns being preferably of nylon. This construction provides a self-contained stretchable fabric but one with no dimensional stability. In FIG. 4, the "break" threads are superimposed over the ground fabric by means of a chain-stitch formation, which addition imparts stability to the fabric in the lengthwise direction.

It will be noted that the "break" yarns are so introduced as to alter the lay of the yarns of the first bar (FIG. 3), whereby there is no float over two needles and the "break" yarns tie in the float on every needle of each course. This gives the required stability in the warp direction for the initial processing.

The total ends of the "break" yarn are chosen or arranged to be weaker in tensile strength at a given elongation than the yarns forming the ground fabric.

It is to be understood that the relative strength of the "break" yarns and the ground yarns has reference to their collective characteristics and not necessarily to their individual qualities. For example, the individual "break" yarns may be stronger than the individual ground yarns, but by using fewer ends in the "break" yarns than are contained in the ground yarns, the "break" threads will be collectively weaker. Hence when the tension is later applied lengthwise to the fabric and the tension exceeds the elongation limits of the "break" yarn, the "break" yarn will snap and the ground fabric will be permitted to stretch to its elastic limit. When the ground fabric has been stretched to a point causing rupture of the "break" yarns as in FIG. 5, the resultant sections of ruptured yarn tend to curl about the stitching points and to protrude from the ground fabric.

In practice, the ground fabric may be constituted by so-called "Helanca" threads which are twist-set nylons, whereas the "break" yarns may be of relatively weak 55 denier acetate threads. Alternatively, the "break" yarns may be formed by glass fiber threads interknit in the ground fabric in the warp direction. While glass fiber threads are relatively strong, by the use of a small number of "break" threads as compared to the number in the ground fabric, the collective strength of the glass fiber threads will be weaker than that of the stretchable ground threads and hence the glass fiber threads will rupture when required to do so. It is also within the scope of this invention to introduce "break" yarns in both the warp and weft of the fabric to inhibit stretch therein in both directions.

The tension required to stretch the base fabric to its elastic limit will have been calculated and designed by construction and the type of yarn used to be greater than that which will be required in any intermediate processing. By this basic construction and suitable choice of yarns used, a fabric is obtained with the requisite amount of stability for intermediate processing and the desired amount of stretch for ultimate molding.

It has been found in practice that when the weaker yarn ruptures, the regularity of the breaks is such as to impart to the fabric a pattern effect. Such patterning is desirable in fields other than industrial and by a suitable choice of break and ground yarns, decorative effects may be produced which render the fabric attractive for the apparel field. The invention therefore covers the production of fabrics of fancy design in which patterning is effected by the introduction of "break" yarns of special characteristics and colors, which yarns are ruptured in the finishing process to achieve novel effects.

It has also been found that when the weaker yarn breaks, the severed filaments of a continuous filament yarn protrude on the surface of the fabric and impart to the fabric a "hand" and appearance similar to fabrics made from spun fibers, as contrasted to continuous filament yarns. The invention therefore encompasses the production of fabrics having an appearance and hand similar to fabrics made from spun fibers, this being effected through the inclusion of continuous filament "break" threads which, when broken during the finishing process, produce the desired hand and appearance.

Figure 6:
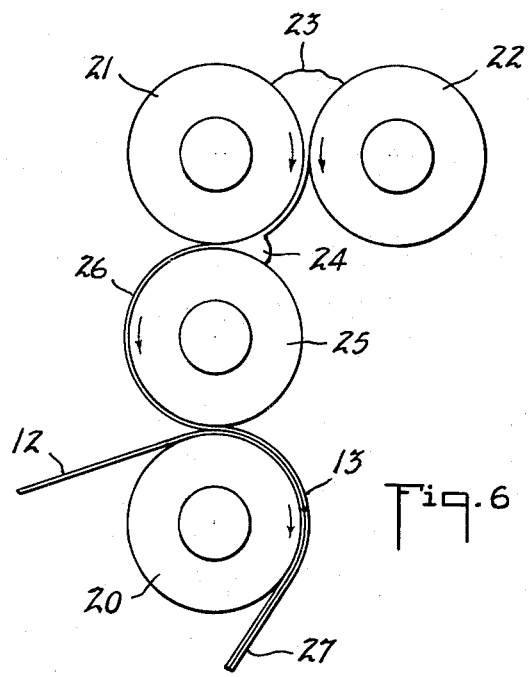
FIG. 6 is a schematic elevational view of apparatus suitable for forming laminated plastic-coated fabric-backed articles in accordance with the present invention, wherein a calender is used for application of the plastic coating.
Figure 7:
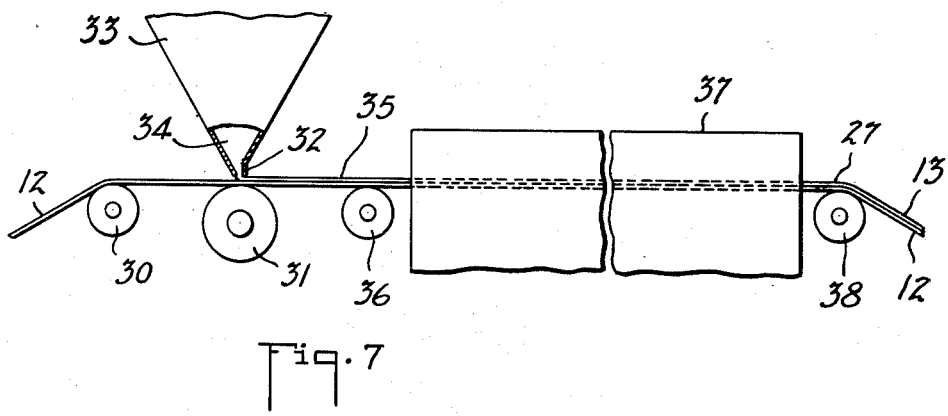
FIG. 7 is a schematic side elevational view of a portion of apparatus suitable for forming similar articles but wherein the plastic coating is applied by means of knife coating or other suitable spreading technique.

Methods for the preparation of the composite or upholstery fabric comprising the plastic layer 13 and the base fabric 12 are illustrated particularly by FIGS. 6 and 7 of the drawing to which particular reference is made. When the calendering method is used, the fabric previously described, comprising the stretchable ground fabric and "break" yarns interlinked with said ground fabric 12, is fed over the lower roll 20 of the calender from a suitable source (not shown). A suitable plastic material, such as a compounded plasticized polyvinyl chloride composition, as hereinafter described, or a plasticized copolymer of polyvinyl chloride and vinylidene chloride or vinyl acetate, is applied above the bite between calender rolls 21 and 22, heated to at least 250° F. and preferably about 300 to 350° F. to form the bank 23. The heated rolls 21 and 22 are spaced sufficiently apart to maintain a suitable bank 24 of plastic composition between the heated rolls 21 and 25 which are spaced from each other the desired amount, .005 to .05 inch and usually about .010 to .040 inch to form the strip 26 of the desired thickness for application to the fabric 12 to form thereon the thermoplastic layer 13. Pressure between the rolls 20 and 25 causes a strip 26 of plastic material to be bonded to the base layer 12 and form the composite sheet material 27 which may be used as an upholstery fabric 27. It may for example be applied to the top surface 11 of the contoured body member 10 of FIGURE 1.

The "break" yarns effectively prevent the removal of the stretch from the base fabric when a plastic layer 13 of the composite fabric 27 is applied to the base fabric. The composite fabric thus produced may be stretched as much as 100% or even more after rupture of the "break" yarns while still retaining all of the desired reinforcing features provided by the base fabric. This permits the fabric to be stretched around corners, to be vacuum or pressure formed to substantially any desired contour, and yet still to retain the fiber reinforcement so necessary and desirable in good quality articles.

In accordance with FIG. 7, the base fabric 12 is passed over the roll 30 and between the guide roll 31 and a suitable knife or spreader 32, which is adjacent or contiguous with the container 33 which contains a plastisol or solution of plasic material, such as any one of the commercial fluid plastisols comprising solid, finely divided polyvinyl chloride or vinyl chloride-acetate copolymer dispersed in plasticizer and which is fusible and gelable at elevated temperatures to produce a solid coating of plasticized polyvinyl chloride, or the material 34 may even be a solution of some suitable resinous material, such as a solution of nitrocellulose, etc. spreadable by the knife 32.

By regulating the space between the bottom edge of the knife 32 and the roll 31, the thickness of the coating 35 may be regulated. The coating 35 passes over the guide roll 36 into the oven 37 which is heated to a suitable temperature to cause fusing and gelling of the plastisol or drying or removal of the solvent solution of thermoplastic material also applied as a coating 35. The composite fabric 27 having the plastic coating 13 and the base fabric 12 emerges from the oven over the roll 38.

The "break" yarns are sufficiently numerous or of sufficient strength to permit substantial tension to be applied to the base fabric 12 before rupture thereof occurs.

In the manufacture of other types of stretchable fabric wherein knitted fabric without the "break" yarns is applied as a base member, extreme care is necessary to prevent loss of all stretch during calendering operation and it is our understanding and experience that it is impossible to prepare stretch fabrics by the knife-coating process because the substantial tension that must be applied to the fabric base removes the residual stretch. The product of the present invention, even after knife-coating may be stretched greatly because the "break" yarns effectively hold the ground fabric from appreciable stretch. In the knife-coating process and calendering process, the "break" yarns run in the direction of movement of the fabric through the calender or under the spreader in case knife-coating technique is utilized.

The following example illustrates two typical thermoplastic resinous compositions suitable for calendering onto the base fabric.

| Ingredients | Parts by Weight | |
|---|---|---|
| | A | B |
| Polyvinyl Chloride | 100 | 100 |
| Dioctyl Phthalate | 30 | 25 |
| Dioctyl Adipate | 10 | 10 |
| Paraplex G-62 (an epoxidized medium molecular weight polyester resin, sold by Rohm & Haas) | 3 | |
| Paraplex G-53 (a high molecular weight polyester resin) | | 25 |
| Barium-Cadmium Stabilizer | 2 | 2 |
| Filler (Calcium Carbonate) | 15 | 20 |

The ingredients are mixed together by mastication at elevated temperature of about 375° F. in accordance with usual practice and calendered onto the base fabric, which had been previously treated with dilute latex (20% solids or so) of a nitrile rubber or other suitable adhesive as usually used for PVC-fabric adhesion, to form a film thereon of about 5 to 50 mils thickness, usually about 15 to 20 mils thickness.

The upholstery material produced after rupture of the "break" yarns may be stretched substantially, depending upon the stretch inherent on the particular ground fabric used, and it is well known how to manufacture fabrics with various degrees of stretch or looseness. The "break" yarns may be provided in any suitable way and can run in more than one direction. However, it is usually unnecessary to have "break" yarns in more than one direction as the calendering or knife-coating operations tend to remove stretch primarily in the direction of the flow of the fabric through calenders, etc. However, when it is desired to minimize any extension in a lateral direction "break" yarns may be provided in both directions so that they can be separately ruptured.

The "break" yarns may be of any desired size to permit elongation to occur only after a certain definite force is applied. After rupture of the "break" yarns, the composite material generally has a modulus of elasticity greater than ten pound per inch at 5% elongation, and less than thirty-five pounds per inch at 10% elongation in at least one direction, and preferably in both directions. The preferred ground fabric generally stretches well beyond 25% of its initial length and stretches of 100% or more may even be provided. This permits the fabric to be molded around corners to give very pleasing appearance to upholstered articles and permits fabric-reinforced laminated materials to be used for vacuum-forming, etc.

The "break" yarns may be cemented to the surface of any suitable ground fabric or they may be sewn to it or woven therein, as is apparent, to obtain the same result. Inasmuch as the "break" yarns hold the ground fabric during the application of resin, the construction of the ground fabric may be varied greatly; even cross-woven ground fabric which is relatively loose when the "break" yarns are applied in one or both directions is suitable to provide substantial stretch. As is well-known, certain shrink-type yarns such as nylon may be used in preparing the ground fabric and the stretch induced therein by heat, which causes some of the yarns (but preferably not all of the yarns) to shrink. Thus, a square-woven fabric may be prepared by utilizing pre-oriented nylon in one or both directions for part of the fibrous material. Then, by subjecting the fabric in the absence of appreciable tension to temperatures between 400 and 475° F. for a short time, the nylon may be raised to a temperature where shrinkage occurs to a less oriented state. Upon stretching of the fabric, the nylon or other shrinkable linear polyamide or polyester becomes oriented again and limits stretch. By regulating the degree of shrinkage, the maximum degree of stretch of the fabric may be provided.

It should also be pointed out that the ground fabric need not be woven or knitted. The present invention is also applicable to non-woven fabrics wherein the fibers are formed into mats and adhered together with suitable adhesives or heat by processes well-known to those skilled in this art. In the case of non-woven fabrics, the "break" threads may be interspersed with the ground fibers in the course of forming the fiber mat or the "break" threads may be laid on top of the completed mat either in the lengthwise direction or transversely, or both, prior to the application of the adhesive or heat to form the finished non-woven fabric.

The polyvinyl chloride resin of the above example may be substituted by copolymers of vinyl chloride and vinyl acetate having 85 to 99% of combined vinyl chloride, vinylidene chloride, and copolymers of vinylidene chloride and vinyl chloride, etc.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A fabric structure having temporary dimensional stability comprising a stretchable ground fabric and breakable yarns interlinked therewith temporarily to stabilize the dimensions thereof, said breakable yarns being selected to rupture solely as a result of a predetermined elongation of the ground fabric which elongation is insufficient to cause rupture of the threads forming said ground fabric.

2. A laminated material comprising a layer of moldable plastic material and a reinforcing fabric structure bonded to said layer, said fabric structure comprising a stretchable ground fabric and breakable yarns interlinked therewith temporarily to stabilize the dimensions thereof, said breakable yarns being selected to rupture solely as a result of a predetermined elongation of the ground fabric which elongation is insufficient to cause rupture of the threads forming said ground fabric, whereby said breakable yarns are ruptured when said plastic material is molded to cause said ground fabric to elongate in conformance thereto.

3. The laminated material of claim 2 in which said layer of moldable plastic has a thickness in the range of .005 to .05 inch, and said laminated material when stretched sufficiently to rupture said breakable yarns without rupture of the threads forming said ground fabric having an elongation of at least 10% in the direction of stretch.

4. The laminated material of claim 2 in which said moldable plastic material is a plasticized polyvinyl halide composition.

References Cited in the file of this patent

UNITED STATES PATENTS

| | | |
|---|---|---|
| 1,635,196 | Steere | July 12, 1927 |
| 2,533,976 | Teague | Dec. 12, 1950 |
| 2,705,688 | Ness et al. | Apr. 5, 1955 |
| 2,706,699 | Plansoen et al. | Apr. 19, 1955 |
| 2,737,701 | Hubbard et al. | Mar. 13, 1956 |
| 2,823,156 | Hedges | Feb. 11, 1958 |
| 2,836,509 | Berry | May 27, 1958 |